United States Patent
Huang et al.

(10) Patent No.: US 8,237,688 B2
(45) Date of Patent: Aug. 7, 2012

(54) CONTRAST CONTROL APPARATUS AND CONTRAST CONTROL METHOD AND IMAGE DISPLAY

(75) Inventors: Kuo-Wei Huang, Taipei County (TW); Chung-Wen Hung, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 1046 days.

(21) Appl. No.: 11/769,722

(22) Filed: Jun. 28, 2007

(65) Prior Publication Data

US 2008/0238935 A1    Oct. 2, 2008

(30) Foreign Application Priority Data

Mar. 30, 2007  (TW) ................................ 96111241 A (51) Int. Cl.
*G09G 3/36* (2006.01)
*G09G 5/00* (2006.01)
*G09G 5/10* (2006.01)
*G06F 3/038* (2006.01)
*G06K 9/00* (2006.01)
*H04N 5/14* (2006.01)

(52) U.S. Cl. ............ 345/204; 345/87; 345/98; 345/102; 345/690; 382/168; 348/671

(58) Field of Classification Search .............. 345/87–89, 345/98, 102, 204, 617, 690–691; 348/671–672; 382/168–172
See application file for complete search history.

(56) References Cited

U.S. PATENT DOCUMENTS

| | | | |
|---|---|---|---|
| 4,799,106 A * | 1/1989 | Moore et al. | 348/619 |
| 5,734,740 A * | 3/1998 | Benn et al. | 382/132 |
| 6,148,103 A * | 11/2000 | Nenonen | 382/169 |
| 6,496,177 B1 | 12/2002 | Burton | |
| 6,856,306 B2 * | 2/2005 | Ito | 345/89 |
| 7,053,881 B2 | 5/2006 | Itoh | |
| 7,692,612 B2 * | 4/2010 | Sankar et al. | 345/77 |
| 7,738,727 B2 * | 6/2010 | Chang et al. | 382/274 |
| 2001/0033260 A1 * | 10/2001 | Nishitani et al. | 345/87 |
| 2002/0011979 A1 * | 1/2002 | Nitta et al. | 345/89 |
| 2004/0207589 A1 * | 10/2004 | Kim et al. | 345/89 |
| 2004/0258324 A1 * | 12/2004 | Liang et al. | 382/274 |
| 2005/0017990 A1 * | 1/2005 | Yoshida | 345/690 |
| 2005/0104842 A1 * | 5/2005 | Baik | 345/102 |
| 2006/0139270 A1 * | 6/2006 | Hong et al. | 345/87 |
| 2006/0284822 A1 * | 12/2006 | Kerofsky et al. | 345/102 |
| 2007/0097069 A1 * | 5/2007 | Kurokawa et al. | 345/102 |
| 2007/0216616 A1 * | 9/2007 | Stessen et al. | 345/84 |

(Continued)

FOREIGN PATENT DOCUMENTS

JP    8201812    8/1996

(Continued)

*Primary Examiner* — Bipin Shalwala
*Assistant Examiner* — Matthew Fry
(74) *Attorney, Agent, or Firm* — Jianq Chyun IP Office (57) ABSTRACT

A contrast control apparatus includes a statistic distribution unit and a characteristic judging unit. The statistic distribution unit receives an image data to have a brightness histogram distribution in statistic. The brightness histogram distribution has a plurality of statistic nodes, respectively corresponding to a plurality of gray levels in statistic. The characteristic judging unit at least receives the brightness histogram distribution to determine a brightness adjusting signal for the image data, so as to proportionally adjust a brightness of a display light source. In addition, the characteristic judging unit also outputs a contrast curve, and the contrast curve represents a plurality of adjusted nodes, respectively corresponding to the statistic nodes. As a result, the brightness of the statistic nodes is changed.

24 Claims, 5 Drawing Sheets

U.S. PATENT DOCUMENTS

| | | | | |
|---|---|---|---|---|
| 2008/0094346 A1* | 4/2008 | De Greef | ............ | 345/102 |
| 2008/0136844 A1* | 6/2008 | Takada et al. | ............ | 345/690 |
| 2009/0115907 A1* | 5/2009 | Baba et al. | ............ | 348/672 |
| 2009/0303264 A1* | 12/2009 | Toshima et al. | ............ | 345/690 |

FOREIGN PATENT DOCUMENTS

| | | |
|---|---|---|
| TW | 469733 | 12/2001 |
| TW | 200532609 | 10/2005 |

* cited by examiner

CONTRAST CONTROL APPARATUS AND CONTRAST CONTROL METHOD AND IMAGE DISPLAY

CROSS-REFERENCE TO RELATED APPLICATION

This application claims the priority benefit of Taiwan application serial no. 96111241, filed Mar. 30, 2007. All disclosure of the Taiwan application is incorporated herein by reference.

BACKGROUND OF THE INVENTION

1. Field of the Invention

The present invention relates to an image contrast control technology. More particularly, the present invention relates to a contrast control apparatus and a method thereof, capable of being applied in the display device, so as to control the contrast effect of the image.

2. Description of Related Art

It is quite an important topic in improving images to enhance the image contrast. The images with a low contrast are mainly improved, for example, in which the difference between the image object and the background brightness is increased in the image. In terms of improving the image contrast, many methods have been developed in the conventional art. The conventional art mostly focuses on enhancing the image itself, but it ignores that the image is finally received by the viewer through the display device and the quality of the image is shown through the display device. However, due to some characteristics of the display device, the input image cannot be truly presented. Therefore, some methods for enhancing the image contrast through controlling the display device have been developed later on. However, the property of the image is ignored, or the mutual relationship between the image property and the display device characteristics is ignored, such that it is impossible for images with various different properties to achieve the effect of enhancing the contrast.

For example, as for a liquid crystal display (LCD) with a cold cathode tube as the backlight source, due to the limitation of the physical characteristics, it is impossible to display a full blackness in the black image. If the conventional method is used, the contrast of certain images cannot be enhanced, and what's worse, the image quality is deteriorated.

Figure 1:
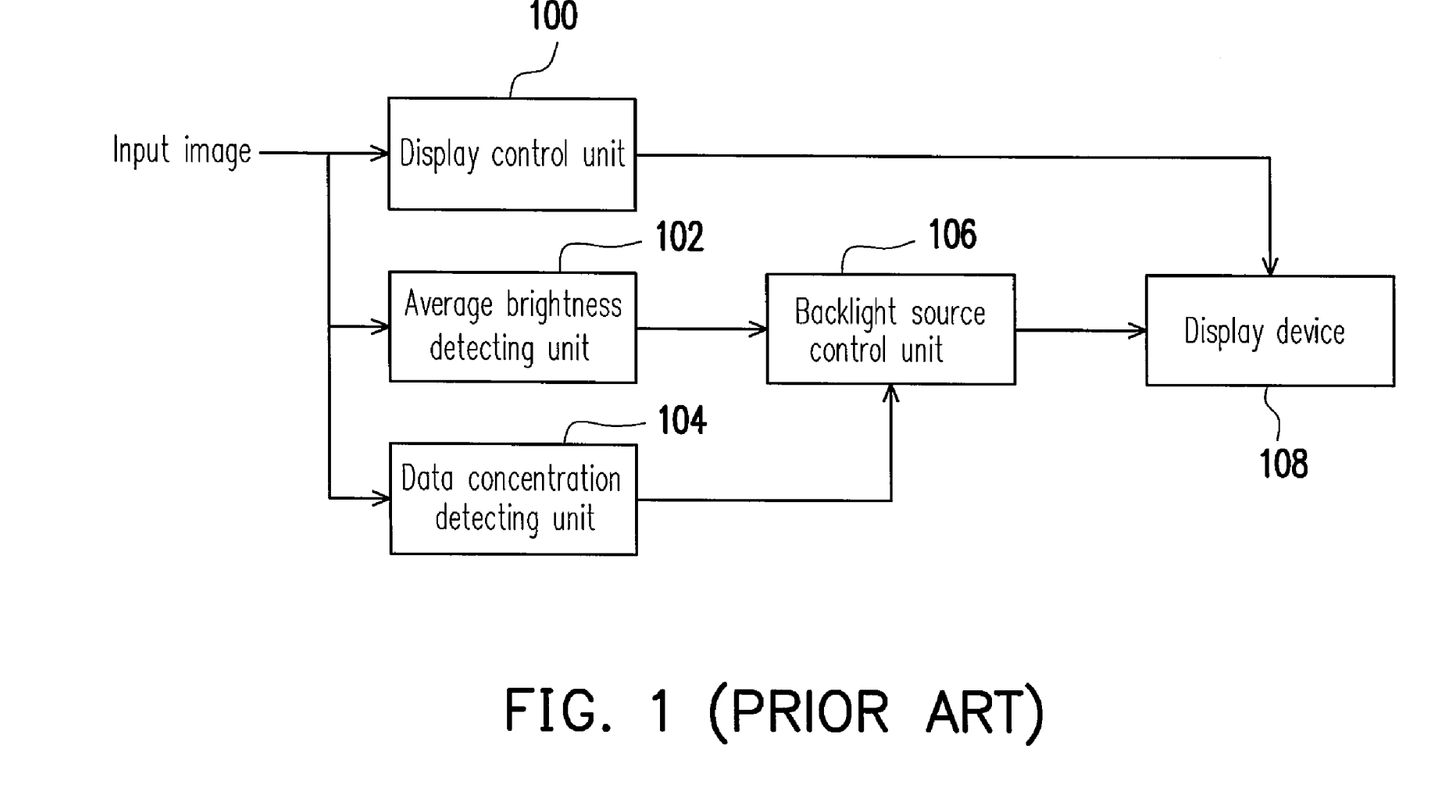
FIG. 1 shows a backlight source control architecture of a conventional display device.

FIG. 1 shows a backlight source control architecture of a conventional display device. The display devices generated by different technologies have unique display characteristics. For example, as for the LCD with the cold cathode tube as the backlight source, it is difficult for the backlight source formed by the cold cathode tubes to be quickly switched on or off. As a result, the backlight source is always in the status of being lighted on. In order to obtain the total dark frame, the lights emitted by the backlight source must be completely blocked by the liquid crystal module. However, in terms of the physical characteristics, it is impossible for the elements to satisfy the requirement of completely blocking the light source. That is, the light leakage usually occurs. Therefore, in order to enhance the image contrast, it is necessary to consider the characteristics of the display device. As disclosed in Japan Patent No. 8-201812, mainly, when the average brightness of the image frame is relatively low, the brightness of the backlight source for the display device is enhanced, and the above factors are not considered, so that the dark part of the image is distorted. In addition, as disclosed in U.S. Pat. No. 7,053,881, the strength of the backlight source for the display device is controlled through the average value of the brightness of the image frame and the data concentration degrees. Although the data concentration information is used on purpose in order to solve the above problem, the enhancement of the image contrast achieved by separately adjusting the backlight source is very limited, and the image distortion still occurs.

FIG. 1 shows a backlight source control architecture of a conventional display device. As shown in FIG. 1, the image data are simultaneously input into a display control unit 100, an average brightness detecting unit 102, and a data concentration detecting unit 104, which are respectively directed to different functional processing. Next, the display control unit 100 directly outputs the data to the display device 108, without adjusting the data. In addition, the outputs of the average brightness detecting unit 102 and the data concentration detecting unit 104 are received by the backlight source control unit to determine the brightness to be changed. Then, a control signal is output to the backlight source module of the display device 108.

The above mentioned methods enhance the contrast merely by adjusting the strength of the backlight source, so the distortion still occurs. Therefore, those skilled in the art are still searching for new technologies capable of more effectively enhancing the contrast effect and further reducing the image distortion.

SUMMARY OF THE INVENTION

Accordingly, the present invention is directed to a contrast control apparatus and a method thereof According to the property of the image frame, not only a backlight source of the display device is dynamically adjusted, but the data as the source of the image is also mutually matched and remapped, so as to enhance the image contrast and avoid distortion.

The contrast control apparatus and method provided by the present invention can be applied on an image display, which is capable of adjusting the strength of the backlight source and simultaneously adjusting the contrast of the image data.

To be embodied and broadly described herein, the present invention provides a contrast control apparatus, which includes a statistic distribution unit and a characteristic judging unit. The statistic distribution unit receives an image data to have a brightness histogram distribution, and the brightness histogram distribution has a plurality of statistic nodes respectively corresponding to a plurality of gray levels. The characteristic judging unit at least receives the brightness histogram distribution, so as to determine a brightness adjusting signal for the image data, and proportionally adjust a brightness of a display light source. In addition, the characteristic judging unit also outputs a contrast curve, and the contrast curve represents a plurality of adjusted nodes respectively corresponding to the statistic nodes, so as to change the brightness of the statistic nodes.

In an embodiment of the present invention, the contrast control apparatus further includes a data mapping unit, for receiving the contrast curve, and remapping the input image data according to the contrast curve, so as to output a corresponding image data. If the scope of the contrast curve is smaller than a maximum dynamic scope, an interpolation manner is adopted to obtain the image data corresponding to the statistic nodes.

In the embodiment of the present invention, the contrast control apparatus further includes a display device control unit, for receiving the contrast curve output by the characteristic judging unit and the corresponding contrast data output by the data mapping unit, so as to convert to a driving signal used to drive a display device, and meanwhile, the display device control unit adjusts the brightness of the display light source according to the brightness adjusting signal.

In the contrast control apparatus according to the embodiment of the present invention, the characteristic judging unit further performs a brightness adjusting compensation on the contrast curve according to the brightness adjusting signal, such that when the brightness of the display light source is reduced, the corresponding brightness of the contrast curve is simultaneously increased.

In the contrast control apparatus according to the embodiment of the present invention, the characteristic judging unit further performs the brightness adjusting compensation on the contrast curve according to the brightness adjusting signal, such that when the brightness of the display light source is increased, the corresponding brightness of the contrast curve is simultaneously reduced.

In the contrast control apparatus according to the embodiment of the present invention, the characteristic judging unit performs the following operations:

calculating a total sum SUM ($H_S$) of the brightness histogram distribution;

calculating a darkness sum SUM ($H_{Dark}$) of a dark part in the brightness histogram distribution, and obtaining a dark ratio R(D)=SUM($H_{Dark}$)/SUM($H_S$);

calculating a brightness sum SUM ($H_{Bright}$) of a bright part in the brightness histogram distribution, and obtaining a bright ratio R(B)=SUM($H_{Bright}$)/SUM($H_S$); and determining the brightness adjusting signal according to the following conditions:

Condition 1: if R(B)<a setting value $T_B$, the brightness adjusting signal is R(D); and Condition 2: if R(B)>a setting value $T_{D1}$, and R(D)<a setting value $T_{D2}$, the brightness adjusting signal is R(B).

In the contrast control apparatus according to the embodiment of the present invention, according to the following conditions, the statistic nodes of the contrast curve are simultaneously adjusted and changed, in which $G_s(n)$ represents a contrast value of the $n^{th}$ statistic node of the contrast curve, B(n) represents an adjusting scale for the $n^{th}$ statistic node, and $G_f(n)$ represents the result of the $n^{th}$ statistic node:

Gf(n)=Gs(n)*B(n), in which if Condition 1 is satisfied, B(n)=1+R(D); and if Condition 2 is satisfied, B(n)=R(B).

According to the embodiment of the present invention, the contrast control apparatus further includes a situation mode unit, for outputting a contrast correction data to the characteristic judging unit, so as to further correct the contrast curve.

The present invention further provides an image display, which includes the contrast control apparatus, together with other units. The contrast control apparatus is used to simultaneously adjust a contrast distribution for a display light source and a display image.

The present invention further provides a contrast control method, applicable for a display device to control the light source, which includes the following steps. Firstly, an image data is received to have a brightness histogram distribution, and the brightness histogram distribution has a plurality of statistic nodes respectively corresponding to a plurality of gray levels. Next, according to the brightness histogram distribution, a brightness adjusting signal of the image data is determined, so as to proportionally adjust a brightness of a display light source. Then, a contrast curve is obtained, which represents a plurality of adjusted nodes respectively corresponding to the statistic nodes, so as to change the brightness of the statistic nodes.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the present invention, the backlight source of the display device is adjusted and the image data is remapped, the statistic distribution of the image dynamic range is analyzed to determine the property of the image, the image distortion, generated after the backlight source is adjusted, is compensated, and finally, an optimized contrast curve with remapped data is generated. By means of outputting the image frame remapped by the optimized contrast curve and adjusting the backlight source, the image finally viewed via the display device achieves the real improvement of the image contrast, and avoids the image distortion. Some embodiments are given below for illustration, but the present invention is not limited to the given embodiments.

Figure 2:
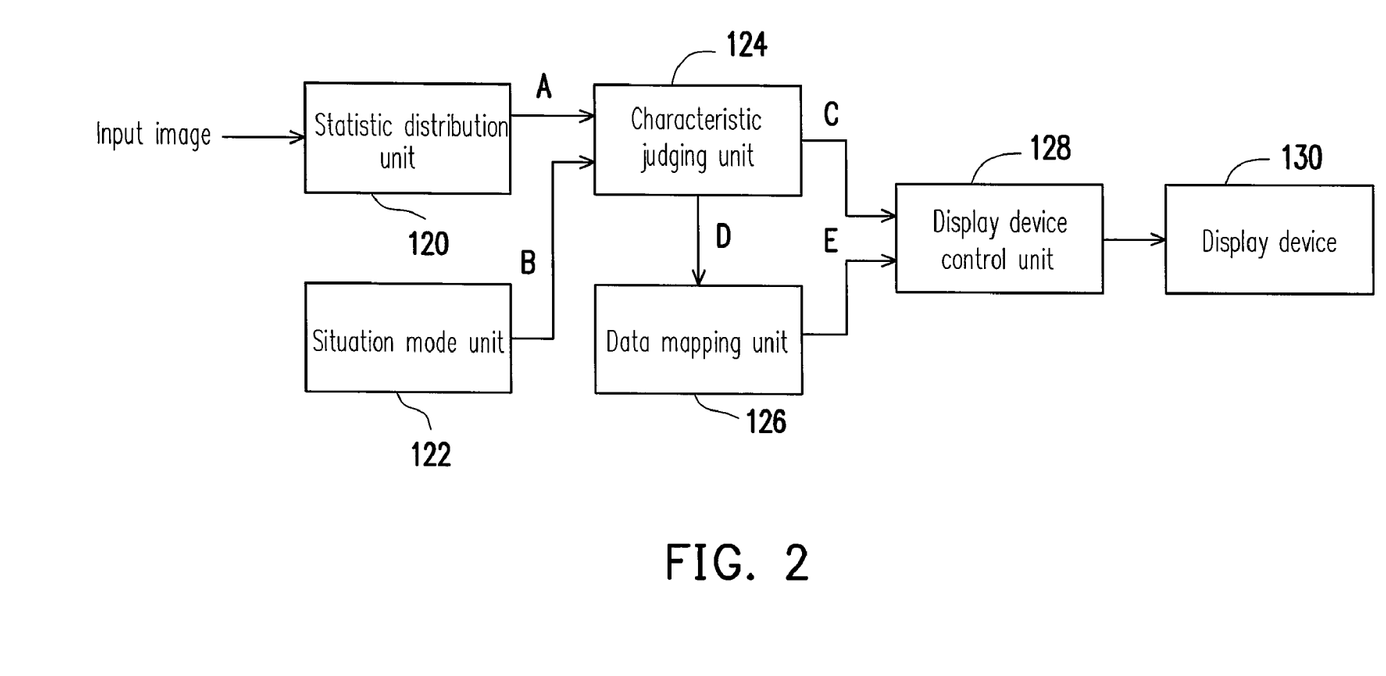
FIG. 2 is a schematic block diagram of an image display structure according to an embodiment of the present invention.

FIG. 2 is a schematic block diagram of an image display structure according to an embodiment of the present invention. Referring to FIG. 2, the input image is, for example, successive images or a static image. Generally, the contrast focuses on the brightness of the image, so the input image can be brightness data of the successive images. The statistic distribution unit 120 makes a histogram of gray levels with the interval distribution of the image dynamic range. In making the histogram, there are N intervals in total to be made, such that the statistical intervals are distributed from $1^{st}$ to $(N-1)^{th}$ statistic nodes or statistical intervals, and thus the brightness distribution histogram is obtained, for example. The statistic distribution unit 120 includes, for example, an accumulator (not shown) to generate a cumulative value for the image frame at the region of each statistical interval. The cumulative value may be a total cumulated value of the number of the image pixels or a total cumulated value of the image data. Signal A is a cumulative result for an image frame in each interval, for example, a brightness histogram.

Figure 3A:
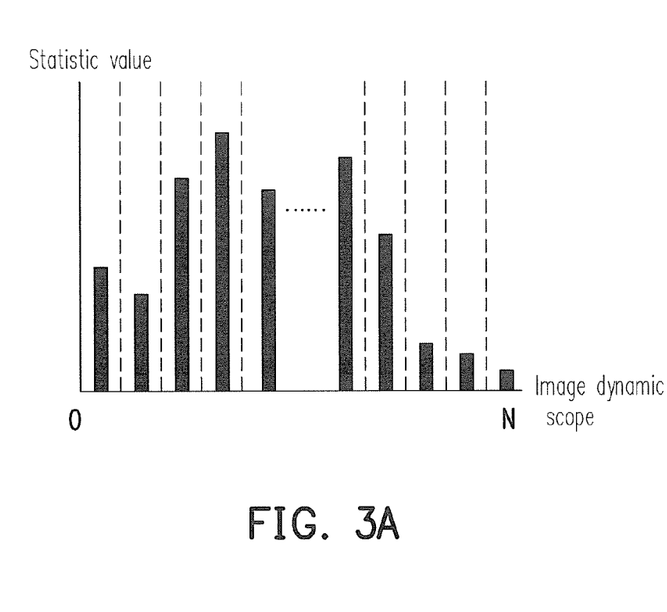
FIGS. 3A to 3B are relation diagrams of an image dynamic scope and a statistical interval according to the embodiment of the present invention.
Figure 3B:
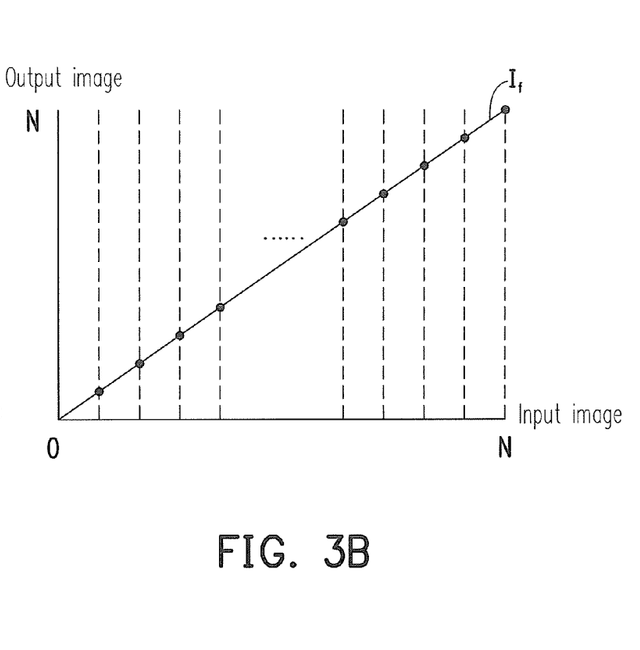

FIGS. 3A to 3B are relation diagrams of an image dynamic range and a statistical interval according to the embodiment of the present invention. Referring to FIG. 3A, it shows the brightness distribution histogram, which is divided into N statistical intervals. The region with a smaller statistical interval value represents the darker pixel distribution in the image, and the region with a larger statistical interval value represents the brighter pixel distribution in the image.

Next, as shown in FIG. 3B, according to the percentage value of the signal A output by the statistic distribution unit 120 in each statistical interval, the characteristic judging unit 124 generates a contrast curve $I_t$. The contrast curve here is formed by $1^{st}$ to $(N-1)^{th}$ interval nodes, and the vertical axis represents a curve formed by connecting the brightness values of the output images corresponding to the original curve nodes. Since the brightness of the image is not adjusted, the contrast curve shows a straight-line-shaped distribution.

The characteristic judging unit 124 of the present invention generates a signal C, which represents the brightness adjusting signal, and used for proportionally adjusting the brightness of the display light source (e.g., the backlight module) subsequently. In addition, a contrast curve is also output, which represents a plurality of adjusted nodes to be output respectively corresponding to the statistic nodes, so as to change the brightness of the statistic nodes.

Figure 4A:
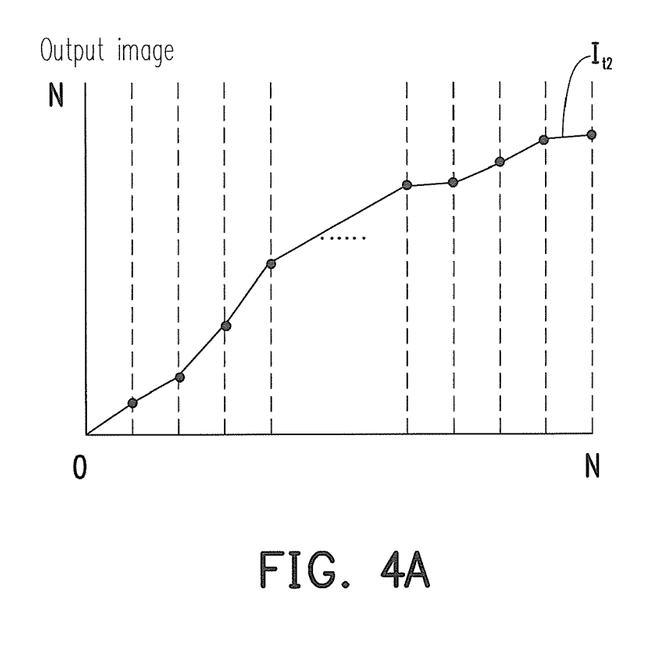
FIGS. 4A to 4B are schematic views of the adjusted contrast curve $I_{t2}$ as a line connected between the curve nodes according to the embodiment of the present invention.
Figure 4B:
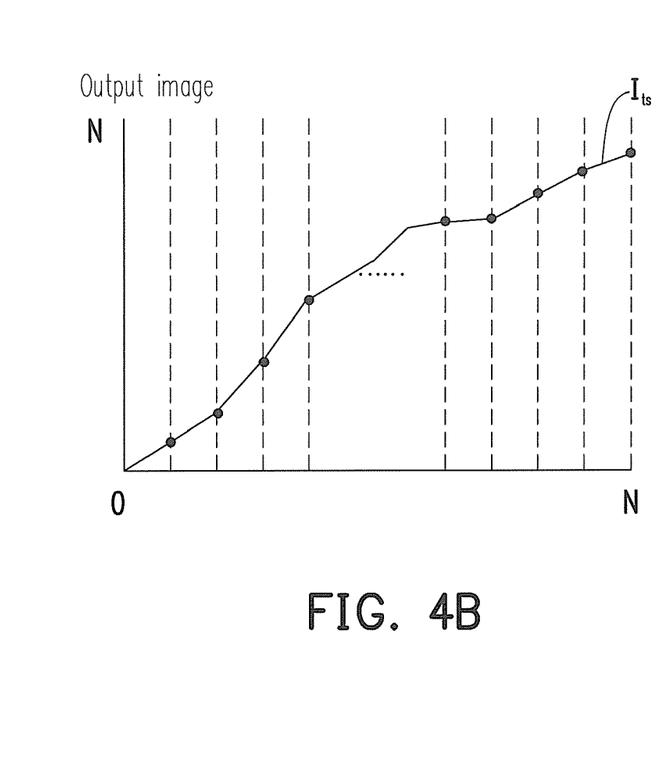

FIGS. 4A to 4B are schematic views of the adjusted contrast curve $I_{t2}$ as a line connected between the curve nodes according to the embodiment of the present invention. The contrast curve $I_{t2}$ of FIG. 4A is obtained from the original contrast curve $I_t$ as shown in FIG. 3B through operations of an adjusting mechanism. The adjusting mechanism includes, for example, the following calculations:

$$IG(n) = IG_{default} + IG_{rest} * (H_n/H_{total}); \qquad (1)$$

$$0 < IG_{default} < IG_{base}; \qquad (2)$$

$$IG_{rest} = N - M * IG_{default}; \text{ and} \qquad (3)$$

$$IG_{base} = N/M, \qquad (4)$$

in which the number of image intervals M and $IG_{default}$ considered during the practical operation are setting values of the hardware or variable configuration setting values; M is the number of intervals in the histogram under actual consideration for the image and generally smaller than N; $H_n$ is a statistic value of the histogram at the $n^{th}$ statistical interval, and $H_{total}$ is a total sum of all the statistic values of all intervals. As a result, the intervals of the histogram after adjustment are the values of IG(n). Therefore, the curve formed by connecting IG(n) is the adjusted contrast curve. In order to obtain the values of IG(n), the $IG_{rest}$ is obtained according to Eq. (3) under the given set values of N, M and $IG_{default}$. However, a range of the $IG_{default}$ is limited by Eq. (2), in which the $IG_{base}$ is obtained according to Eq. (4) under the given set value of N and M. Then, Eq. (1) is used to calculate the values of IG(n) in each $n^{th}$ statistical interval.

In addition, for example, according to different settings, for example, a PC game mode, a cinema mode, or a common mode, the situation mode unit 122 can also generate the adjustment S(n) of the curve node, i.e., the signal B. The contrast curve $I_{t2}$ of FIG. 4A is a result from timing the adjustment S(n) for each $n^{th}$ statistical interval. Therefore, the input image for each $n^{th}$ statistical interval is adjusted because the adjustment S(n) is not equal to one, which is the curve $I_t$ in FIG. 3B. If the effect of the situation mode is considered, the IG(n) is also adjusted, for example, $$G_s(n) = IG(n) * S(n). \qquad (5)$$

The $G_s(n)$ is a further adjustment on the adjustment S(n) by timing the calculated. IG(n) to obtain the contrast curve $I_{ts}$ in FIG. 4B.

The contrast curve $I_{ts}$ formed by $G_s(n)$ is shown in FIG. 4B. The characteristic judging unit 124 obtains a new statistic numerical value remapped from the contrast curve $I_{ts}$. It is assumed that the statistic value of each interval is respectively $H_S(n)$, the following operations are, for example, performed:

a. $SUM(H_S) = H_S(1) + H_S(2) + \ldots + H_S(N-1) + H_S(N)$;

b. $SUM(H_{Dark}) = H_S(1) + H_S(2) + \ldots + H_S(D)$, in which D is a fixed value or a value after configuration, and represents a darker range;

c. $SUM(H_{Bright}) = H_S(B) + H_S(B+1) + \ldots + H_S(N-1) + H_S(N)$, in which B is a fixed value or a value after configuration, and represents a brighter range;

d. $R(D) = SUM(D)/SUM(H_S)$; and e. $R(B) = SUM(B)/SUM(H_S)$.

Furthermore, according to the above conditions, a brightness adjusting signal C of the backlight source is generated, and the generation conditions are listed as follows:

(i) if $R(B) < T_B$, the adjusting factor of the brightness for the backlight source to be adjusted down is equal to R(D), in which $T_B$ is a fixed value or a value after configuration; and (ii) if $R(B) > T_{D1}$, and $R(D) < T_{D2}$, the adjusting factor of the brightness for the backlight source to be adjusted up is equal to R(B).

The brightness of the backlight source varies according to the above conditions, so the image displayed at this time is changed accordingly. However, the changing is necessary, so according to the change of the brightness of the backlight source, the original contrast curve $I_{ts}$ is compensated in the present invention to avoid the image distortion caused by unnecessary changes. The process for compensating the contrast curve of the present invention is to generate preferred contrast curve nodes according to the adjustment conditions of the contrast curve $I_{ts}$ and the backlight source, so as to perform, for example, the following calculation:

$$G_f(n) = G_s(n) * B(n),$$

in which $G_s(n)$ is the result obtained from Equation (5), and furthermore, as for B(n), if Condition (i) is satisfied, B(n) is set as, for example, B(n)=1+R(D), so as to compensate the brightness change caused by the reducing of the brightness of the backlight source, and meanwhile, the effect that the dark level is much darker is simultaneously achieved. If Condition (ii) is satisfied, B(n) directly equals to R(B), i.e., B(n)=R(B), so as to compensate the brightness change caused by the increasing of the brightness of the backlight source, and meanwhile, the effect that the bright level is much brighter is achieved.

Figure 5A:
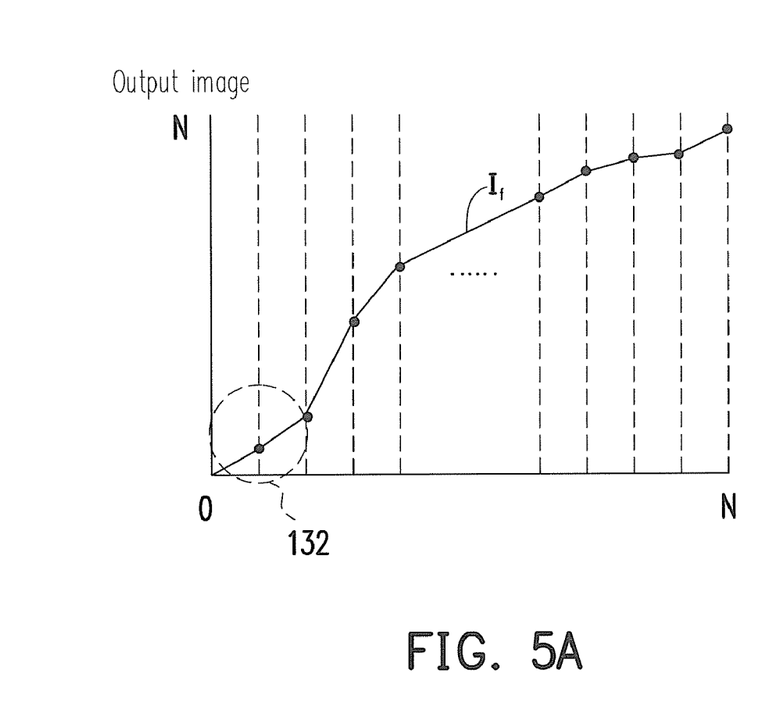
FIGS. 5A to 5B are schematic views of the optimized contrast curve $I_f$ obtained according to the contrast curve of FIG. 4B and the above two conditions.
Figure 5B:
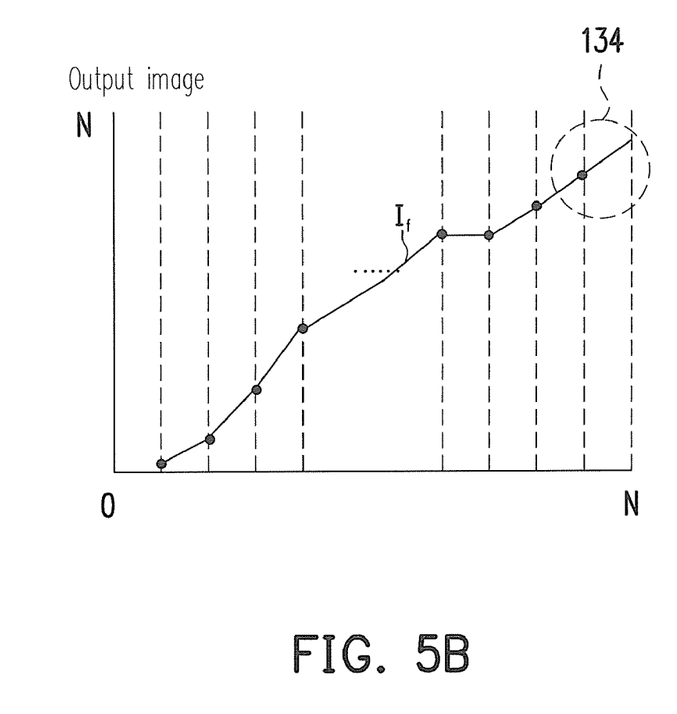

FIGS. 5A to 5B are schematic views of the optimized contrast curve $I_f$ obtained according to the contrast curve of FIG. 4B and the above two conditions. The adjusted contrast curve $I_f$, i.e., the signal D, is obtained by connecting the adjusted curve nodes.

Referring to FIG. 5A, as for the dark frame, in order to make the pixels of the dark region have a sufficient dark contrast, when the brightness of the light source is adjusted lower, the brightness of the contrast curve is increased in the present invention, but the darkest level is not adjusted, which can be seen from the region 132. Referring to FIG. 5B, as for the bright frame, in order to make the pixels of the bright region have a sufficient bright contrast, when the brightness of the light source is adjusted higher, the brightness of the contrast curve is reduced in the present invention, but the brightest level is not adjusted, which can be seen from the region 134.

The signal D is generated by a processor or together with other processing circuits; and the actually-used circuits are arranged depending upon the practical requirements. Furthermore, the signal D can be updated according to each image frame, or can be updated after an integral determination by adopting a plurality of frames. In this manner, the contrast control apparatus can achieve the adjusting objective, and can be applied to other systems or apparatuses with such demands, so as to achieve the effect of adjusting the contrast. For example, as for the image display (shown in FIG. 2), the signal D can be input to the subsequent units.

For example, the signal D is input to the data mapping unit 126 shown in FIG. 2. In the data mapping unit 126, the data as the source of the image is remapped according to the signal D. The signal D is the node values for the optimized contrast curve $I_f$. However, if the statistical interval is smaller than the maximum dynamic range, for example, the mapping relationship between the nodes is obtained through performing an interpolation to two neighboring interval nodes, the data of all the image pixels of the dynamic range are remapped to generate the image output data with the optimized contrast. Therefore, the data mapping unit 126 outputs a signal E.

Next, the display control unit 128 receives the brightness control signal C and the signal E of the image data to convert to a PWM signal being synchronous with a synchronous signal Vsync. The PWM signal adjusts the frequency and the ratio of the high level to the low level according to the signal C, so as to achieve an optimal effect of the display device.

The signal output by the display control unit 128 is input to the display device 130, for example, a liquid crystal display panel, so as to achieve the image display, in which the light source module and the pixel data relevant to the contrast in the image are adjusted simultaneously to at least achieve the effect of reducing the distortion.

In addition, according to the above mechanism, the hardware circuits of the given embodiments are not particularly restricted in the present invention. In other words, according to the contrast adjusting mechanism of the present invention, the corresponding hardware circuit can be varied depending upon the practical design. In addition, the present invention also provides a method for controlling the contrast, which covers the adjusting and changing of the hardware circuit.

To sum up, the present invention is not only capable of dynamically adjusting the backlight source of the display device, but also capable of remapping the data as the source of the image according to the property of the image frame, so as to achieve the effect of enhancing the image contrast and avoiding distortion.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A contrast control apparatus, comprising:
    a statistic distribution unit, for receiving an image data to have a brightness distribution, wherein the brightness distribution has a plurality of statistic counting values at statistic nodes, respectively corresponding to a plurality of intervals of gray levels, wherein each of the intervals represents a range of the gray levels and the statistic counting value represents the number of pixels falling within the range of the gray levels; and
    a characteristic judging unit, for at least receiving the brightness distribution, and determining a brightness adjusting signal for the image data, so as to proportionally adjust a brightness strength of a display light source according to the brightness adjusting signal, and for outputting a contrast curve, wherein the contrast curve represents a plurality of adjusted nodes with adjusted contrast values respectively corresponding to the statistic nodes, so as to change gray levels of the pixels respectively within the statistic nodes according to the brightness strength of the display light source being adjusted,
    wherein the contrast curve IG(n) is calculated out according to Equations (1)-(4):

$$IG(n)=IG_{default}+IG_{rest}*(H_n/H_{total}); \qquad (1)$$

$$0<IG_{default}<IG_{base}; \qquad (2)$$

$$IG_{rest}=N-M*IG_{default}; \text{ and} \qquad (3)$$

$$IG_{base}=N/M, \qquad (4)$$

in which the $IG_{default}$ is a setting value; the N is a maximum gray level, the M is the number of intervals and smaller than the N; the $H_n$ is the statistic counting value of the histogram at the $n^{th}$ interval, and $H_{total}$ is a total sum of all the statistic counting values of all the intervals, wherein the contrast curve is formed by connecting the IG(n) at each $n^{th}$ interval.

2. The contrast control apparatus as claimed in claim 1, further comprising a data mapping unit, for receiving the contrast curve and re-mapping the input image data according to the contrast curve, so as to output an adjusted image data.

3. The contrast control apparatus as claimed in claim 2, further comprising a display device control unit, for receiving the contrast curve output by the characteristic judging unit and the adjusted image data output by the data mapping unit, so as to convert the adjusted image data to a driving signal used to drive a display device, wherein the display device control unit adjusts the brightness strength of the display light source according to the brightness adjusting signal.

4. The contrast control apparatus as claimed in claim 1, wherein the characteristic judging unit further performs a brightness adjusting compensation on the contrast curve according to the brightness adjusting signal, such that when the brightness strength of the display light source is reduced, the corresponding brightness of the contrast curve is simultaneously increased.

5. The contrast control apparatus as claimed in claim 1, wherein the characteristic judging unit further performs the brightness adjusting compensation on the contrast curve according to the brightness adjusting signal, such that when the brightness strength of the display light source is increased, the corresponding brightness of the contrast curve is simultaneously reduced.

6. The contrast control apparatus as claimed in claim 1, wherein the characteristic judging unit performs the following operations:
    calculating a total sum of all the statistic nodes in the brightness distribution, wherein the total sum is represented by SUM ($H_S$) and Hs is an index to indicate all the statistic nodes in the brightness distribution are summed together;
    calculating a darkness sum of a part of the statistic nodes within a determined dark part in the brightness distribution, and obtaining a darkness ratio R(D)=SUM($H_{Dark}$)/SUM($H_S$), wherein the darkness sum is represented by SUM ($H_{Dark}$) and $H_{Dark}$ is an index to indicate only the dark part in the brightness distribution are summed together;

calculating a brightness sum, represented by SUM ($H_{Bright}$), of a part of the statistic nodes within a determined bright part in the brightness distribution, and obtaining a brightness ratio R(B)=SUM($H_{Bright}$)/SUM ($H_S$); and determining the brightness adjusting signal according to the following conditions, including:

Condition 1: if R(B)<a setting value $T_B$, the brightness adjusting signal is R(D) to adjust the display light source, wherein the setting value $T_B$ is a set constant for determining whether or not the display light source is necessarily adjusted down; and Condition 2: if R(B)>a setting value $T_{D1}$, and R(D)<a setting value $T_{D2}$, the brightness adjusting signal is R(B) to adjust the display light source, wherein the setting value $T_{D1}$ and $T_{D2}$ are set constants for determining whether or not the display light source is necessarily adjusted up, wherein the setting value $T_{D1}$ is greater than the setting value $T_B$, wherein any one of Condition 1 and Condition 2 is satisfied then the brightness adjusting signal is accordingly adjusted.

7. The contrast control apparatus as claimed in claim 6, wherein according to the following conditions, the contrast values at the statistic nodes corresponding to an X-axis of the brightness distribution for forming the contrast curve are simultaneously adjusted and changed, wherein $G_s(n)$ represents one of the contrast values at the $n^{th}$ statistic node of the contrast curve, B(n) represents an adjusting scale at the $n^{th}$ statistic node wherein Condition 1 and Condition 2 have been checked to obtain R(D) or R(B), and $G_f(n)$ represents a result at the $n^{th}$ statistic node:

$G_f(n)=G_s(n)*B(n)$, wherein if Condition 1 is satisfied, B(n)=1+R(D); and if Condition 2 is satisfied, B(n)=R(B).

8. The contrast control apparatus as claimed in claim 1, further comprising a situation mode unit, for outputting a contrast correction data to the characteristic judging unit, so as to further correct the contrast curve.

9. The contrast control apparatus as claimed in claim 1, wherein the image data is a static image or a successive motion image.

10. An image display, comprising:

a contrast control apparatus, for simultaneously adjusting a brightness strength of a display light source and a contrast distribution of a display image, wherein the contrast control apparatus comprises:

a statistic distribution unit, for receiving an image data to have a brightness distribution, wherein the brightness distribution has a plurality of statistic counting values at statistic nodes respectively corresponding to a plurality of intervals of gray levels, wherein each of the intervals represents a range of the gray levels and the statistic counting value represents the number of pixels falling within the range of the gray levels; and a characteristic judging unit, for at least receiving the brightness distribution, and determining a brightness adjusting signal for the image data, so as to proportionally adjust a brightness strength of the display light source; and outputting a contrast curve, wherein the contrast curve represents a plurality of adjusted nodes with adjusted contrast values respectively corresponding to the statistic nodes, so as to change the brightness at the statistic nodes according to the brightness strength of the display light source being adjusted;

a data mapping unit, for receiving the contrast curve and mapping the data to output an adjusted image data corresponding to the image data;

a display device control unit, for receiving the contrast curve output by the characteristic judging unit and the adjusted image data output by the data mapping unit, so as to convert the adjusted image data to an image driving signal used to drive a display device, wherein the display device control unit adjusts the brightness strength of the display light source according to the brightness adjusting signal; and a display device, for receiving the image driving signal, so as to display the display image after the contrast is adjusted, wherein the contrast curve IG(n) is calculated out according to Equations (1)-(4):

$$IG(n)=IG_{default}+IG_{rest}*(H_n/H_{total});  \quad (1)$$

$$0<IG_{default}<IG_{base};  \quad (2)$$

$$IG_{rest}=N-M*IG_{default}; \text{ and} \quad (3)$$

$$IG_{base}=N/M, \quad (4)$$

in which the $IG_{default}$ is a setting value; the N is a maximum gray level, the M is the number of the statistic nodes and smaller than the N; the $H_n$ is the statistic counting value of the histogram at the $n^{th}$ statistic node, and $H_{total}$ is a total sum of all the statistic counting values of all the statistic nodes, wherein the contrast curve is formed by connecting the IG(n) at each $n^{th}$ statistic node.

11. The image display as claimed in claim 10, wherein the characteristic judging unit further performs a brightness adjusting compensation on the contrast curve according to the brightness status, such that when the brightness of the display light source is reduced, the corresponding brightness of the contrast curve is simultaneously increased.

12. The image display as claimed in claim 10, wherein the characteristic judging unit further performs the brightness adjusting compensation on the contrast curve according to the brightness status, such that when the brightness of the display light source is increased, the corresponding brightness of the contrast curve is simultaneously reduced.

13. The image display as claimed in claim 10, wherein the image data is a static image or a successive motion image.

14. The image display as claimed in claim 10, wherein the characteristic judging unit performs the following operations:

calculating a total sum of all the statistic nodes in the brightness distribution, wherein the total sum is represented by SUM ($H_S$) and Hs is an index to indicate all the statistic nodes in the brightness distribution are summed together;

calculating a darkness sum of a part of the statistic nodes within a determined dark part in the brightness distribution, and obtaining a darkness ratio R(D)=SUM($H_{Dark}$)/ SUM($H_S$), wherein the darkness sum is represented by SUM ($H_{Dark}$) and $H_{Dark}$ is an index to indicate only the dark part in the brightness distribution are summed together;

calculating a brightness sum, represented by SUM ($H_{Bright}$), of a part of the statistic nodes within a determined bright part in the brightness distribution, and obtaining a brightness ratio R(B)=SUM($H_{Bright}$)/SUM ($H_S$); and determining the brightness adjusting signal according to the following conditions:

Condition 1: if R(B)<a setting value $T_B$, the brightness adjusting signal is R(D) to adjust the display light source, wherein the setting value $T_B$ is a set constant for determining whether or not the display light source is necessarily adjusted down; and Condition 2: if R(B)>a setting value $T_{D1}$, and R(D)<a setting value $T_{D2}$, the brightness adjusting signal is R(B) to adjust the display light source, wherein the setting value $T_{D1}$ and $T_{D2}$ are set constants for determining whether or not the display light source is necessarily adjusted up, wherein the setting value $T_{D1}$ is greater than the setting value $T_B$, wherein any one of the Condition 1 and the Condition 2 is satisfied then the brightness adjusting signal is accordingly adjusted.

15. The image display as claimed in claim 14, wherein according to the following conditions, contrast values at the statistic nodes corresponding to an X-axis of the brightness distribution for forming the contrast curve are simultaneously adjusted and changed, wherein $G_s(n)$ represents one of the contrast values at the $n^{th}$ statistic node of the contrast curve corresponding to an X-axis of the brightness distribution, B(n) represents an adjusting scale at the $n^{th}$ statistic node wherein Condition 1 and Condition 2 have been checked to obtain R(D) or R(B, and $G_f(n)$ represents a result at the $n^{th}$ statistic node:

$G_f(n)=G_s(n)*B(n)$, wherein
if Condition 1 is satisfied, $B(n)=1+R(D)$; and
if Condition 2 is satisfied, $B(n)=R(B)$.

16. The image display as claimed in claim 10, further comprising a situation mode unit, for outputting a contrast correction data to the characteristic judging unit, so as to further correct the contrast curve.

17. A contrast control method, applicable for a display device to control a light source, comprising:

receiving an image data to have a brightness distribution, wherein the brightness distribution has statistic counting values at a plurality of statistic nodes respectively corresponding to a plurality of intervals of gray levels, wherein each of the intervals represents a range of the gray levels and the statistic counting value represents the number of pixels falling within the range of the gray levels;

determining a brightness adjusting signal for the image data according to the brightness distribution to proportionally adjust a brightness strength of a display light source; and obtaining a contrast curve, wherein the contrast curve with adjusted contrast values represents a plurality of adjusted nodes respectively corresponding to the statistic nodes, so as to change the brightness at the statistic nodes according to the brightness strength of the display light source being adjusted, wherein the contrast curve IG(n) is calculated out according to Equations (1)-(4):

$$IG(n)=IG_{default}+IG_{rest}*(H_n/H_{total}); \quad (1)$$

$$0<IG_{default}<IG_{base}; \quad (2)$$

$$IG_{rest}=N-M*IG_{default}; \text{ and} \quad (3)$$

$$IG_{base}=N/M, \quad (4)$$

in which the $IG_{default}$ is a setting value; the N is a maximum gray level, the M is the number of the statistic nodes and smaller than the N; the $H_n$ is the statistic counting value of the histogram at the $n^{th}$ statistic node, and $H_{total}$ is a total sum of all the statistic counting values of all the statistic nodes, wherein the contrast curve is formed by connecting the IG(n) at each $n^{th}$ statistic node.

18. The contrast control method as claimed in claim 17, further comprising remapping the input image data according to the contrast curve, so as to output an adjusted image data.

19. The contrast control method as claimed in claim 17, further comprising performing a brightness adjusting compensation on the contrast curve according to the brightness adjusting signal, such that when the brightness strength of the display light source is reduced, the corresponding brightness of the contrast curve is simultaneously increased.

20. The contrast control method as claimed in claim 17, further comprising performing the brightness adjusting compensation on the contrast curve according to the brightness adjusting signal, such that when the brightness of the display light source is increased, the corresponding brightness of the contrast curve is simultaneously reduced.

21. The contrast control method as claimed in claim 17, wherein the step of adjusting the brightness of the display light source comprises:

calculating a total sum of all the statistic nodes in the brightness distribution, wherein the total sum is represented by SUM ($H_S$) and Hs is an index to indicate all the statistic nodes in the brightness distribution are summed together;

calculating a darkness sum of a part of the statistic nodes within a set dark part in the brightness distribution, and obtaining a darkness ratio $R(D)=SUM(H_{Dark})/SUM(H_S)$, wherein the darkness sum is represented by SUM ($H_{Dark}$) and $H_{Dark}$ is an index to indicate only the dark part in the brightness distribution are summed together;

calculating a brightness sum, represented by SUM ($H_{Bright}$), of a part of the statistic nodes within a set bright part in the brightness distribution, and obtaining a brightness ratio $R(B)=SUM(H_{Bright})/SUM(H_S)$; and determining the brightness adjusting signal according to the following conditions:

Condition 1: if R(B)<a setting value $T_B$, the brightness adjusting signal is R(D) to adjust the display light source, wherein the setting value $T_B$ is a set constant for determining whether or not the display light source is necessarily adjusted down; and Condition 2: if R(B)>a setting value $T_{D1}$, and R(D)<a setting value $T_{D2}$, the brightness adjusting signal is R(B) to adjust the display light source, wherein the setting value $T_{D1}$ and $T_{D2}$ are set constants for determining whether or not the display light source is necessarily adjusted up, wherein the setting value $T_{D1}$ is greater than the setting value $T_B$, wherein any one of the Condition 1 and the Condition 2 is satisfied then the brightness adjusting signal is accordingly adjusted.

22. The contrast control method as claimed in claim 21, wherein according to the following conditions, contrast values at the statistic nodes corresponding to an X-axis of the brightness distribution for forming the contrast curve are simultaneously adjusted and changed, wherein $G_s(n)$ represents one of the contrast values at the $n^{th}$ statistic node of the contrast curve corresponding to an X-axis of the brightness distribution, B(n) represents an adjusting scale at the $n^{th}$ statistic node wherein Condition 1 and Condition 2 have been checked to obtain R(D) or R(B), and $G_f(n)$ represents a result at the $n^{th}$ statistic node:

$G_f(n)=G_s(n)*B(n)$, wherein
if the Condition 1 is satisfied, $B(n)=1+R(D)$; and
if the Condition 2 is satisfied, $B(n)=R(B)$.

23. The contrast control method as claimed in claim 21, further comprising referring to a situation mode data, so as to further correct the contrast curve.

24. The contrast control method as claimed in claim 17, wherein the image data is a static image or a successive motion image.

* * * * *